United States Patent

[11] 3,556,490

| | | |
|---|---|---|
| [72] | Inventor | Ole K. Bøckman |
| | | Oslo, Norway |
| [21] | Appl. No. | 821,814 |
| [22] | Filed | May 5, 1969 |
| [45] | Patented | Jan. 19, 1971 |
| [73] | Assignee | Aktiebolaget Svenska Flaktfabriken |
| | | Stockholm, Sweden |
| [32] | Priority | May 7, 1968 |
| [33] | | Sweden |
| [31] | | No. 6103/68 |

[54] GAS-LIQUID CONTACT APPARATUS AND METHOD
10 Claims, 2 Drawing Figs.

[52] U.S. Cl. .................................................... 261/98, 55/91, 55/231
[51] Int. Cl. ........................................................ B01f 3/04
[50] Field of Search .......................................... 261/94–98; 55/231, 91, 99

[56] References Cited
UNITED STATES PATENTS

| | | | |
|---|---|---|---|
| 2,691,423 | 10/1954 | McIlvaine..................... | 261/94 |
| 3,219,324 | 11/1965 | Williams et al. .............. | 261/95 |
| 3,302,372 | 2/1967 | Hynson et al. ................ | 55/91X |
| 3,348,825 | 10/1967 | McIlvaine..................... | 261/98 |
| 3,350,075 | 10/1967 | Douglas........................ | 55/91X |
| 3,488,039 | 1/1970 | Ekman.......................... | 55/231X |

Primary Examiner—Tim R. Miles
Attorney—Howson and Howson

ABSTRACT: A wet scrubber for effecting liquid-gas contact in which the gas is passed through a bed of suspended loose contact material which is wetted by a liquid. The wetting liquid is injected into the contact material in the form of a compact jet directed upwardly along the central axis of the scrubber so as to impart to the contact material a controlled circulatory motion in the contact zone.

PATENTED JAN 19 1971 3,556,490
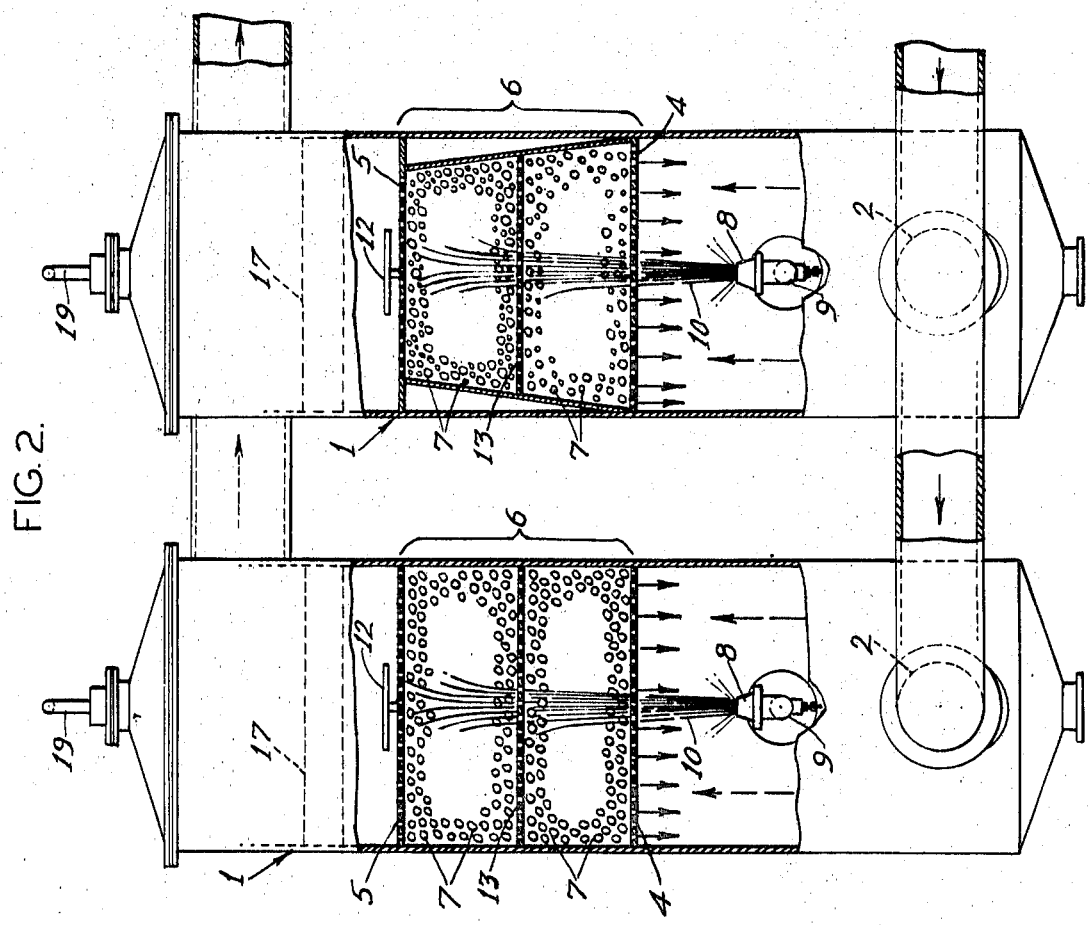
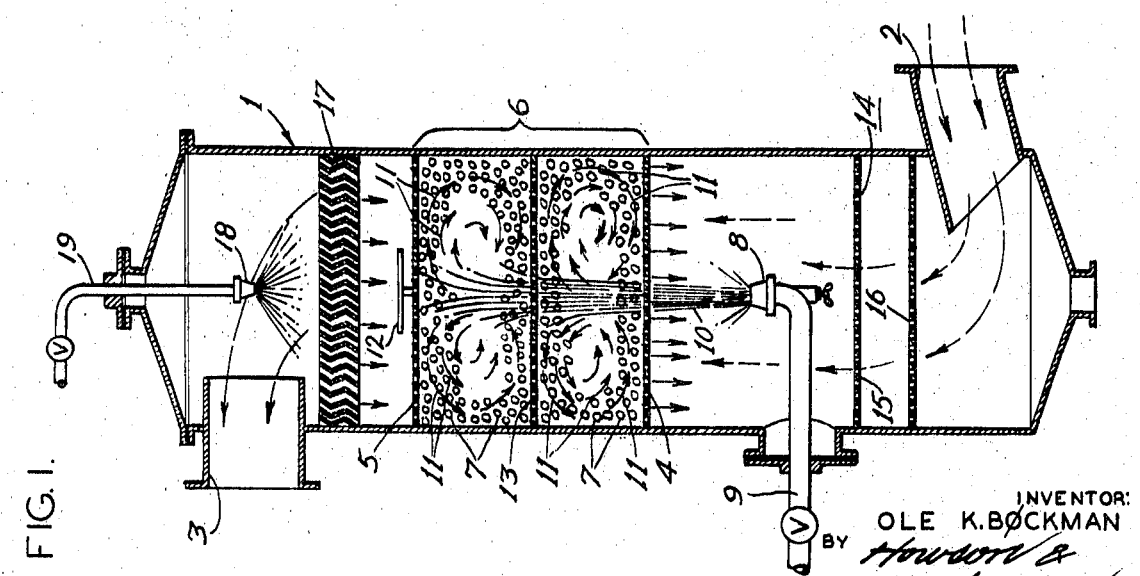
INVENTOR:
OLE K. BØCKMAN
BY Howson & Howson
ATTYS.

GAS-LIQUID CONTACT APPARATUS AND METHOD

The present invention relates to an apparatus for effecting an intimate contact between a gas and a liquid for heat exchanging, gas cleaning, gas absorption or the like, in which apparatus the gas is directed upwards from below through a contact zone containing lightweight and freely movable contact bodies with a speed so adjusted, that the contact bodies are maintained in suspension, whereat the contact bodies are wetted with a liquid supplied by a member mounted below the contact zone.

Conventional apparatus of the aforementioned kind can be divided into the following main types, with respect to their construction and mode of operation:

Apparatus with lightweight contact bodies wherein the gas in supplied from below and the liquid in a counterflow from above, and where the contact bodies are maintained in suspension by the gas in a relatively dense layer, a so-called floating layer with small movement of the contact bodies tightly adjacent a grating, which bounds the contact zone upwardly.

Apparatus according to the aforesaid wherein, however, said grating is designed so as to deflect the contact bodies to the periphery of the contact zone and impart to them a certain circulating motion.

Apparatus wherein the contact bodies are given the opportunity of moving freely in large arbitrary paths within a range of motion, which is relatively large in relation to the total volume of the contact bodies in resting position.

Apparatus wherein the liquid is supplied in a concurrent flow, with the gas by means of nozzles placed below a grating, which bounds the contact zone downwardly.

All of the aforesaid embodiments have in common that the liquid as far as possible is distributed uniformly across the entire cross section of the contact zone, while the motion of the contact bodies is entirely indefinite, possibly with the exception of the second of the aforesaid embodiments. It has been found that the uncontrolled motion of the contact bodies in most cases results in a nonuniform distribution of the contact bodies, counted in number of bodies per unit of cross section area. This gives rise to a nonuniform gas speed distribution across the cross section, with marked sections of respectively high and low gas speed. Quite natural, the nonuniform speed distribution reduces the efficiency of the device, because the greatest gas quantity will pass through sections with a relatively small number of contact bodies. Moreover, owing to the aforementioned uniform distribution of liquid, the relation between gas and liquid amount will be unfavorable in sections with a high gas speed.

The invention, which has as its object to eliminate the aforesaid disadvantages, is characterized in that the member for supplying liquid is disposed centrally below the contact zone and designed so as to supply the liquid in the form of a relatively well closed jet upwards through the contact zone substantially along the axis of symmetry of said zone, thereby giving the contact bodies a controlled circulation motion in the contact zone without tendency of disturbing pulsations. For effecting the main part of the liquid to be deflected and spread uniformly across the entire cross section of the contact zone, it is a prerequisite condition that the throw length of the liquid jet which depends on the liquid pressure at the liquid supply member, is controlled by means of a suitable throttling member.

According to an expedient embodiment of the invention an obstacle, preferably in the form of a substantially plane plate, is mounted above the contact zone, against which obstacle too strong a liquid jet, which possibly may be formed, is deflected backwards down into the contact zone.

Other imaginable embodiments of the invention become evident from the following description.

The invention will now be described in greater detail with reference to the accompanying drawing showing an expedient embodiment of the invention.

FIG. 1 is a transverse sectional view of gas-liquid contact apparatus embodying the present invention; and FIG. 2 is a front elevational view of the apparatus shown in FIG. 1 with portions broken away in adjoining sections thereof to illustrate the internal structure thereof.

In the drawing, 1 designates a casing for a gas cleaner designed as a vertical shaft with an inlet 2 for crude gas and an outlet 3 for cleaned gas. Within the casing are provided two gratings 4 and 5, which bound a contact zone 6 including freely movable contact bodies 7 intended to be maintained suspended by the gas flowing through said zone. According to the invention, the liquid supply member consists of a nozzle 8 mounted centrally below the contact zone and connected to a liquid supply line 9 and so designed as to supply the liquid in the form of a relatively well closed jet 10 upwards through the contact zone. The liquid jet during its upward flow takes along the contact bodies in the central part of the contact zone where a highly effective section with a concentration of both liquid and contact bodies is obtained. In the upper part of the contact zone the contact bodies are moved out to the periphery by the deflecting liquid jet and are thus given, as indicated by the arrows 11, a controlled circulation motion without tendency of disturbing pulsations. For ensuring the deflection of the liquid jet at a suitable hi height, irrespective of pressure variations possibly occurring in the liquid supplied, in the embodiment shown a plate 12 is provided. 13 designates an intermediate grating dividing the contact zone into two partial zones. For effecting uniform distribution of the ingoing gas over the cross section area of the gas cleaner, a means 14 is mounted in the lower portion of the gas cleaner, said means in the embodiment shown being in the form of two perforated sheets 15 and 16. For separating liquid droplets possibly following with the outgoing gas, a drop catching means 17 is mounted above the contact zone. Said means 17 is flushed clean by a spray nozzle 18 disposed at a suitable height above the drop catching means and connected to a liquid supply line 19.

The contact bodies 7 are preferably formed as hollow spherical balls with a density lower than that of the liquid, but exceeding that of the gas. The diameters of the balls should not exceed 100 mm., may be of either mutually varying or equal size, and may be either uniformly or nonuniformly distributed between the partial zones above and below the partitioning grating 13, as shown in the adjoining sections of the apparatus in FIG. 2.

The gratings 4, 5 and 13 form partition walls which are permeable to the gas and liquid, but are impermeable to the contact bodies. Within the contact zone, the sidewalls of the casing may be made convergent in the flow direction of the gas shown in the right-hand section of the apparatus (FIG. 2).

As shown in FIG. 2, a plurality of the units are included in the apparatus alongside of a one another so as to provide parallel gas flow therethrough, the corresponding parts in each unit having similar reference numerals.

Thus the present invention provides a liquid-gas contact apparatus having a contact zone 6 with loose contact bodies 7 therein. The nozzle member 8 for supplying the liquid is disposed centrally below the contact zone 6 and is designed to supply the liquid in the form of a relatively compact jet 10 upwards through the contact zone 6 substantially along the axis of symmetry of the zone. To insure uniform deflection and spreading of the liquid across the entire cross section of the contact zone, the flow length of the liquid jet, which depends on the liquid pressure in the nozzle, is controlled by means of a suitable throttling member. In addition, an obstacle, preferably in the form of a substantially plane plate 12 is mounted above the contact zone to deflect the liquid back into the zone if excessive strength is imparted to the liquid jet 10.

The apparatus described above is merely an exemplifying embodiment, and the construction can be varied in several ways within the scope of the inventive idea.

I claim:

1. An apparatus for effecting an intimate contact between a gas and a liquid for heat exchanging, gas cleaning, gas absorption or the like, in which apparatus the gas is directed upwards from below through a contact zone including lightweight and freely movable contact bodies with a speed so adjusted, that the contact bodies are maintained in suspension, whereat the contact bodies are wetted with a liquid supplied by a member mounted below the contact zone, characterized in that the member for supplying liquid is disposed centrally below the contact zone and designed so as to supply the liquid in the form of a relatively well closed jet upwards through the contact zone substantially along the axis of symmetry of said zone, thereby giving the contact bodies a controlled circulation motion in the contact zone without tendency of disturbing pulsations.

2. An apparatus according to claim 1, characterized in that an obstacle, preferably in the form of a substantially plane plate, is mounted above the contact zone, against which obstacle too strong a liquid jet, which possibly may be formed, is deflected backwards down into the contact zone.

3. An apparatus according to claim 1, characterized in that the contact bodies are formed as hollow, preferably spherical balls with a density being lower than that of the liquid, but exceeding that of the gas, said balls having diameters not exceeding 100 mm.

4. An apparatus according to claim 1, characterized in that the contact zone is divided into two or more partial zones located one above the other and separated by a partition wall, which is permeable to the gas and liquid, but unpermeable to the contact bodies, the number of contact bodies being distributed between the partial zones.

5. An apparatus according to claim 1, characterized in that the sidewalls of the contact zone are made convergent in the flow direction of the gas.

6. An apparatus according to claim 1, characterized in that below the contact zone is mounted a means for even distribution of the gas over the cross section area of the contact zone.

7. An apparatus according to claim 1, characterized in that a drop catching means is mounted above the contact zone and that above said drop catching means is mounted a means for flush-cleaning the drop catching means.

8. An apparatus for effecting an intimate contact between a gas and a liquid, characterized in that a plurality of units constructed according to claim 1 are placed to the side of one another for parallel gas flow.

9. Apparatus for scrubbing a gas with a liquid comprising a casing having a longitudinal axis disposed upright with means to introduce the gaseous medium into said casing adjacent its bottom and to withdraw gaseous medium from said casing adjacent its top whereby said gaseous medium is caused to flow longitudinally upward through said casing, grating means comprising longitudinally spaced-apart elements disposed transversely of said casing to define therebetween a contact zone within said casing, loose lightweight contact material interposed within said contact zone in surface-contact with the gaseous medium passing longitudinally through said casing, and liquid supply means below said contact zone having nozzle means directed upwardly along the central axis of said casing to project a compact jet of liquid upwardly within said casing through said contact zone along said longitudinal axis to thereby effect a controlled circulatory motion of said loose contact elements within said zone, said grating means confining said contact elements to within said contact zone without preventing the flow of gaseous medium upwardly therethrough.

10. A method for effecting controlled circulatory motion of contact bodies within a scrubber having contact bodies confined in a contact zone between transverse grating elements spaced longitudinally within an upright longitudinal channel, comprising the steps of positioning a liquid supply means below said contact zone and controlling the flow of liquid through said supply means to provide a compact jet of liquid which is projected upwardly within said channel through said contact zone into contact with the contact elements therein to both wet the surfaces of said elements and to effect a controlled circulatory motion of said elements within said contact zone.